Aug. 19, 1952     K. C. BUGG     2,607,560
LINE TIGHTENER

Filed March 22, 1947     3 Sheets-Sheet 1

INVENTOR.
Kenly C. Bugg,
BY
Arthurson, Huxley, Byron + Knight
Attys.

Aug. 19, 1952 K. C. BUGG 2,607,560
LINE TIGHTENER
Filed March 22, 1947 3 Sheets-Sheet 2
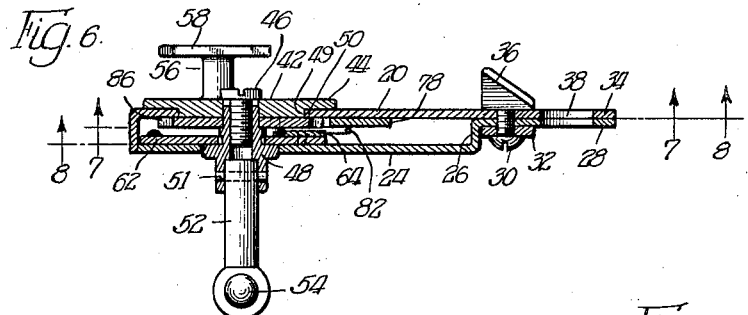
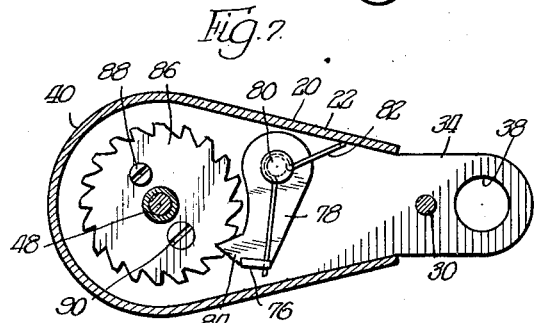
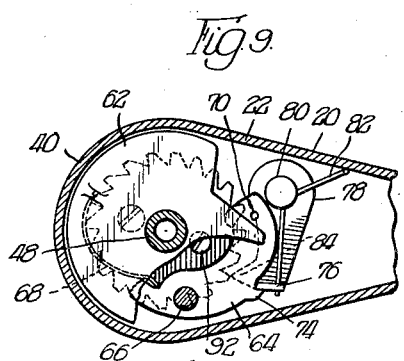
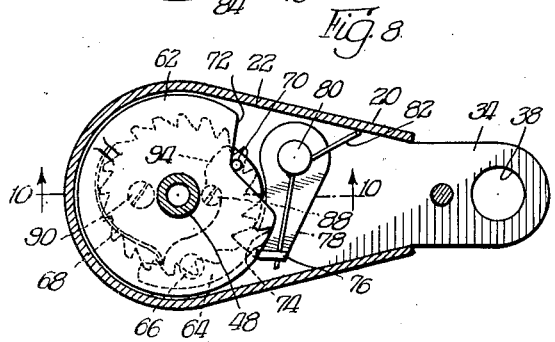
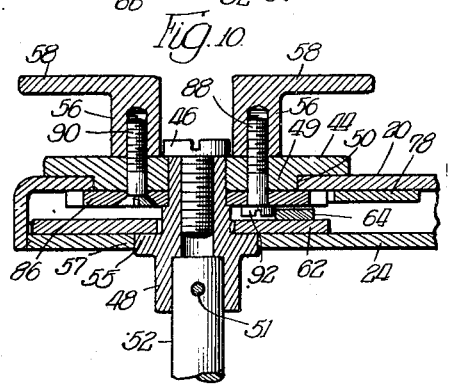
INVENTOR.
Kenly C. Bugg,
BY Aug. 19, 1952      K. C. BUGG      2,607,560
LINE TIGHTENER
Filed March 22, 1947      3 Sheets-Sheet 3
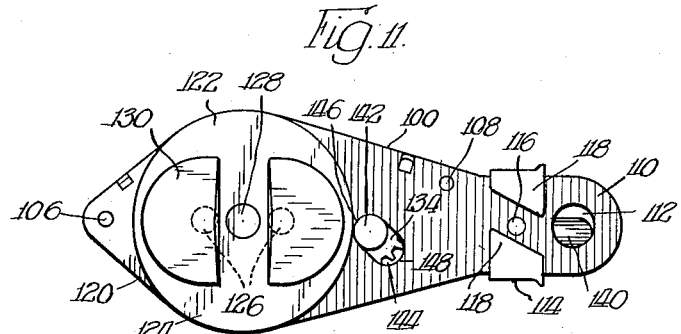
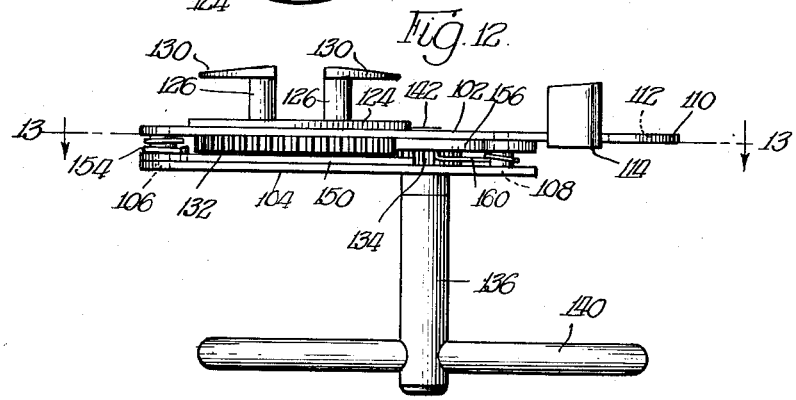
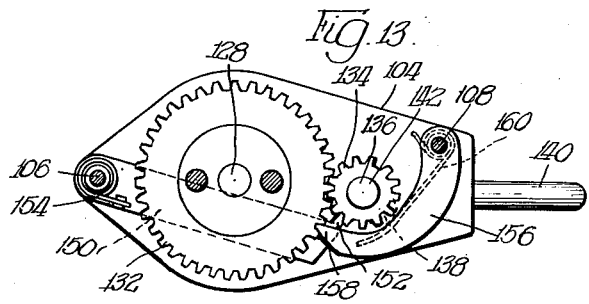
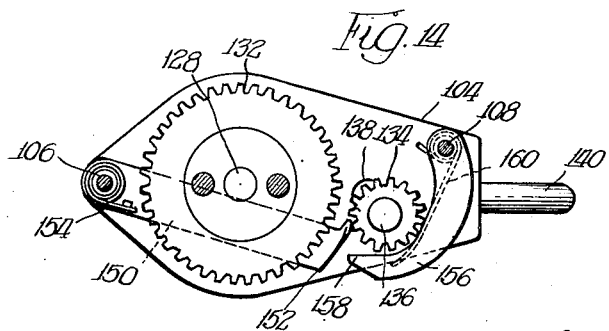
INVENTOR.
Kenly C. Bugg, Patented Aug. 19, 1952

2,607,560

UNITED STATES PATENT OFFICE 2,607,560

LINE TIGHTENER

Kenly C. Bugg, Fort Wayne, Ind.

Application March 22, 1947, Serial No. 737,368

3 Claims. (Cl. 254—161)

This invention pertains to a reel or tightening device or jack for selectively tensioning a flexible member such as a rope, line, wire, chain or the like.

It is an object of the invention to provide a tightening device which is adapted to remove the slack in a line or the like, which line may be weighted, as for example the tightening of a clothes line either before wash is supported thereon or while it is supported thereon.

Another object of the invention is to provide a tightening device which is so constructed and arranged that it may readily be adapted for multiple uses in tightening a line or the like, even though the line has already been suspended, in which case it may be tightened without unfastening the line or even one end thereof. Or the slack may be removed where the line is fastened at one end and supported at the other in which case the device only engages the line, or the line may be tightened where the device is connected to a support and engages the line.

Another object of the invention is to provide a tightening device for a line or the like, wherein it is possible to take up the line in both directions so as to tighten it quickly and making it possible to store a relatively large amount of line.

Another object of the invention is to provide a tightening device for a line or the like which is small, compact, inexpensive and rugged which makes it possible to be used in packing, hauling, or binding, in fact one which may be used anywhere that a line or the like is to be tightened and wherein the device may be easily and quickly released.

Another object of the invention is to provide a reel having mechanism for rotating it in one direction, which mechanism is movable to another position to permit reverse rotation of said reel.

Another object of the invention is to provide a reel which may be used to snub or lock a line and one which may be used to take up a relatively long length of line.

Another object of the invention is to provide a tightening device for a line or the like, having a reel which is associated with a member movable in one direction to rotate the reel to storing position, the member being operated to a predetermined position to permit release of the reel from storing position, the rotation of the reel from storing position being incapable of moving said member.

Another object of the invention is to provide a tightening device wherein the tightening member can be disconnected from the operating member merely by rotative movement of said operative member.

Another object of the invention is to provide a tightening device wherein the tightening member can be disconnected from the operating member by rotation and bodily movements of said operating member.

Another object of the invention is to provide a tightening device for taking up slack in a line, such as a clothes line, painter, tarpaulin holding line, etc., wherein the device may be applied at an end of a line or at an intermediate point in a fastened line, and wherein there is provided means between the actuating device and reel giving the operator a mechanical advantage.

Another object of the invention is to provide a tightening device for a line wherein the breakaway device is so arranged that the gears therein always seek a true pitch center.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 6 is a sectional elevation of the tightening device illustrated in Figures 4 and 5, the same being taken substantially in the plane as indicated by the line 6—6 of Figure 4;

Figure 7 is a fragmentary sectional plan view, taken substantially in the plane as indicated by the line 7—7 of Figure 6;

Figure 8 is a sectional plan view taken substantially in the plane as indicated by the line 8—8 of Figure 6, showing the parts in position for rotating the reel of the tightening device by the operating means;

Figure 9 is a fragmentary sectional elevation corresponding to Figure 8, but showing a part broken away, illustrating the parts in position where the reel is released from the operating means;

Figure 10 is an enlarged fragmentary sectional elevation taken substantially in the plane as indicated by the line 10—10 of Figure 8;

Figure 11 is a plan view of a modified form of tightening device embodying the invention, the same looking in the direction of the reel, i. e., downwardly as viewed in Figure 12;

Figure 12 is a side elevation of a tightening device illustrated in Figure 11;

Figure 13 is a plan view, partly in section, taken substantially in the plane as indicated by the line 13—13 of Figure 12, and showing the mechanism in position for rotation of the reel for tightening operation; and Figure 14 is a sectional plan view corresponding to Figure 13 showing the parts in position wherein the reel can run free to move from tightened position to inoperative position.

Figure 1:
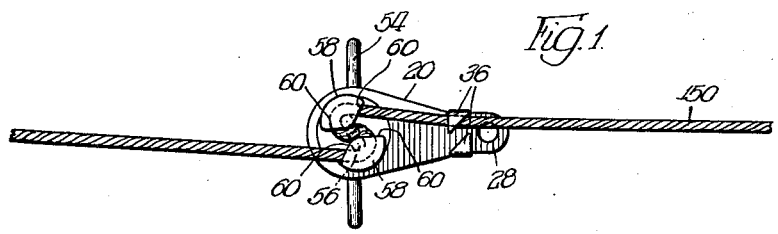
Figure 1 is a view showing one form of the tightening device embodying the invention, in one position for tightening a line.

This application is a continuation-in-part of application Serial No. 577,544, filed February 12, 1945 now abandoned.

Referring first of all to the form of tightening device or jack illustrated in Figures 4 to 10 inclusive, the tightener comprises a body housing 20 flanged as at 22 for the reception of a cover plate 24 fitted therein, said cover plate being flanged as at 26 and reflanged at 28, being secured to the housing 20 as by the bolt 30. The bolt 30 also serves to fasten to the housing 20 the guide plate 32 which extends around the projecting end 28 of the cover plate, and around the projecting end 34 of the housing 20, the plate 32 being formed with spaced guide lugs or ears 36. Other forms of guides may be used such as a closed loop, in which case the line would have to be threaded, or spaced rollers may be provided. The ends 28 and 34 are apertured as at 38, forming a convenient means for suspending the tightener.

Adjacent the enlarged preferably arcuate end 40 of the housing and cover plate a reel 42 is rotatably mounted. Said reel comprises a circular plate member 44 pivotally secured as by bolt 46 to one end of the socket member 48, said plate having a bearing 49 received in a corresponding opening 50 in the housing 20. Said socket member, in the embodiment shown, is secured as at 51 to the post 52 of the operating handle 54, though it is to be understood, of course, that the socket member may be so shaped that a removable operating key or member may be used, in which case the socket member may be flush with the plate 24. As shown, the socket member is provided with a bearing 55 received in a corresponding opening 57 in the plate 24.

The plate member 44 is provided with the projecting lugs 56 disposed adjacent the pivot 46 and substantially diametrically spaced from each other, said lugs being provided at their outer ends with the generally arcuate retainer plates 58 spaced from each other and extending radially. In order to facilitate the entrance of a line or other member to be tightened, the retainer plates 58 may be cut away as shown at 60 (Figure 1), the cut-away portions 60 opposite each other being flared away from each other.

The socket member 48 is fixedly provided with the notched, generally circular plate 62, said plate having the pawl 64 pivoted thereto as at 66, a spring 68 being carried by the plate engaging one end of said pawl, urging it in a counterclockwise direction as viewed in Figure 8 about the pivot 66. The pawl 64 is provided with the pin 70 which limits the inward movement of the pawl by engagement in the notch 72 of the plate 62. The pawl is provided with a lug or projection 74 adapted to engage the lug or projection 76 provided on the ratchet pawl 78.

The ratchet pawl 78 is pivoted as at 80 to the housing 20 and a spring 82 is provided, urging the pawl in a clockwise direction, as viewed in Figure 7, about its pivot 80. The pawl 78 is provided with the ratchet engaging projection 84 for engaging the teeth of the ratchet 86, said ratchet being fixed as at 88 and 90 to the reel 42. The bolt 88 may be provided with the projecting head 92 which is adapted to be engaged by the end or projection 94 of the pawl 64.

In operation of this form of the device rotation of the shaft 52 (Figures 4, 5, 7, 8 and 9) in a clockwise direction rotates the socket member in a clockwise direction, which in turn similarly rotates the notched plate 62 causing the projection 94 of the pawl 64 to engage the head 92 of the bolt 88 in turn rotating the reel, causing the ratchet 86 to be moved to various positions with respect to the ratchet pawl 78, and said pawl will lock the reel against rotation in a counterclockwise direction as viewed in Figures 7 to 9.

When it is desired to release the reel, the shaft 52 is rotated in a counterclockwise direction (Figures 4, 5, 7, 8 and 9) until the lug 74 engages the lug 76 of pawl 78 as illustrated in Figure 9, whereupon a slight counterclockwise movement of the socket member 48 causes the end 94 of the pawl to be released from its engagement with the head 92 of the bolt 88. Continued slight movement of the socket member 48 in a counterclockwise direction causes the pawl 64 to move the pawl 78 in a counterclockwise direction about its pivot 80 to release the projection 84 from the ratchet 86, permitting free rotation of the reel. Release of the handle from its pawl releasing position permits the springs 82 and 68 to move the pawls to their operative positions where the projection 84 is in ratchet engaging position and the end 94 is in the path of the head 92, in which case rotation of the socket 48 in a clockwise direction permits the pawl end 94 to pick up the head 92 to rotate the reel.

In the modification illustrated in Figures 11 to 14, inclusive, the housing 100 is provided comprising spaced plates 102 and 104 secured together as by the rivets 106 and 108. Plate 102 is provided with the extension 110 having the eye 112 providing securing means for the device, and the extension 110 is provided with the guide plate 114 (similar to plate 32) secured thereto as at 116, said plate being formed with the spaced guide lugs or ears 118.

Adjacent the enlarged end 120 reel 122 is pivotally mounted, said reel being similar to reel 42. The reel comprises the circular plate member 124 having projecting lugs 126 disposed in each side of the pivot 128, preferably being diametrically opposite each other, the lugs being provided at their outer end with the generally arcuate retainer plates 130 spaced from each other and extending radially of the plate 122. Plates 130, of course, may be shaped in a similar manner to plates 58.

Pivot 128 is non-rotatably provided with the pinion-ratchet 132, said pinion-ratchet being adapted to be engaged by the pinion-ratchet 134 non-rotatably mounted on the operating shaft 136. Ratchet 132 and pinion-ratchet 134 are so proportioned as to give the desired mechanical advantage to the one rotating shaft 136. Shaft 136 extends through slot 138 provided in plate 104 and said shaft is provided with the operating handle 140. By using the slot mounting a desirable break-away device is provided as will be later described, and also this mounting causes the pinion 132 and pinion-ratchet 134 to always seek a true pitch center, so that expensive gearing and the mounting thereof becomes unnecessary. Shaft 136 is also provided with the bearing extension 142 adapted to be received in and travel in a slot 144 similar to slot 138 and provided in plate 102. Slots 138 and 144 are so disposed that when the pinion-ratchets 132 and 134 are in mesh, shaft 136 and its bearing 142 is at the end 146 of the respective slots most closely adjacent the shaft 128. When the device is conditioned so that the reel is free to turn independently of the handle 140, that is, when pinion-ratchets are disengaged, then the shaft 136 and its bearing 142 are at the end 148 of the respective slots farthest from pivot 128.

Pawl 150 is pivoted to pivot 106 and provided with the pinion tooth 152 adapted to engage the pinion-ratchet 134. Tooth 152 is urged toward engagement with the pinion-ratchet 134 by means of a spring 154. Ratchet 156 is pivoted at 108 and has a tooth 158 adapted to engage the pinion-ratchet 132, said tooth 158 being urged toward ratchet engaging position by means of the spring 160.

Figure 2:
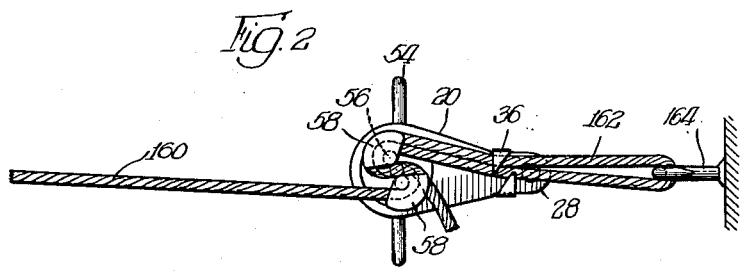
Figure 2 is a view showing one form of the tightening device embodying the invention, in another position for tightening a line.
Figure 3:
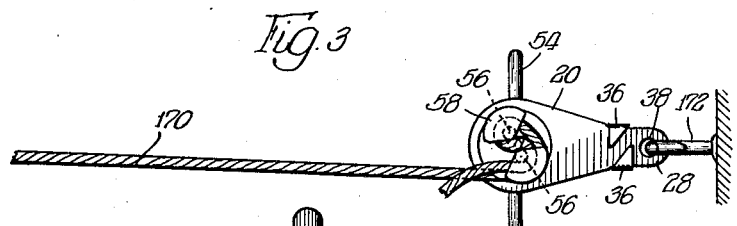
Figure 3 is a view showing one form of the tightening device embodying the invention in still another position for tightening a line.
Figure 4:
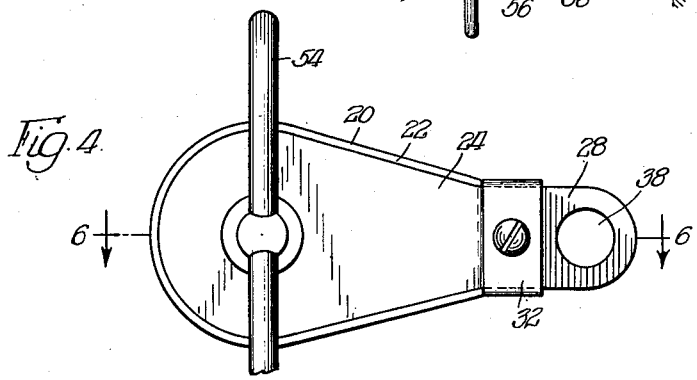
Figure 4 is a plan view of one form of tightening device embodying the invention, the same looking toward the actuating side thereof.
Figure 5:
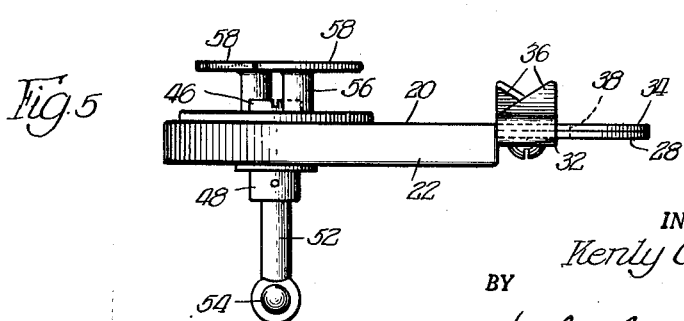
Figure 5 is a side elevation of the form of tightening device illustrated in Figure 4.

When it is desired to tighten a line such as where the device is placed in any of the positions illustrated in Figures 1 to 3, shaft 136 is adapted to be rotated in a counterclockwise direction as viewed in Figures 11 and 13. In tightening condition, therefore, tooth 158 of pawl 156 is adapted to engage pinion-ratchet 132 and in tightening operation, of course, the reel 122 will be rotated in a clockwise direction as viewed in Figure 11. The pawl 156 being operative, the reel is prevented from unwinding.

When it is desired to release the reel so that the line may be unwound or loosened, the shaft 136 is rotated in a clockwise direction as viewed in Figures 11 and 13. This rotation of shaft 136 will cause the pinion-ratchet 134 to ride on tooth 152 of pawl 150, causing the shaft 136 to be moved bodily along the slots to the remote end 148 of said slots. This will disconnect the pinion-ratchets and will cause the pinion-ratchet 134 to move the tooth 158 of pawl 156 out of engagement with the teeth of pinion-ratchet 132, thus permitting the reel to freely rotate to inoperative position. Release of the handle 140 will permit the spring 160 to urge the pawl 156 against the pinion-ratchet 134, urging the pinion-ratchets into meshing engagement and permitting the tooth 158 of pawl 156 to operatively engage the pinion-ratchet 132 to prevent further free rotation of the reel. If spring 160 is not strong enough to engage pinion-ratchets 132 and 134 the first rotative movement of the handle 140 in a tightening direction (counterclockwise in Figures 11 and 13) will cause the pinion-ratchet 134 to move toward pinion-ratchet 132 by pivoting on tooth 152 to a position where shaft 136 is at the close end 146 of slot 144 in which position the pawls are operative and the pinion-ratchets are in mesh.

The tighteners, above described, may be used in various positions with respect to a line, such as illustrated in Figures 1, 2 and 3. While the tightener shown in Figures 1 to 3 is specifically that shown in Figures 4 to 10 inclusive, and so numbered, it is, of course, understood that the uses described with respect to Figures 1 to 3, are equally applicable to the tightener shown in Figures 11 to 14. In Figure 1 the line 150 can be assumed to be fastened at each end. The tightener may then be slipped on the line, the line passing between the spaced plates 58, one side of the line passing between the positioning lugs 36. Rotation of the handle then in a counterclockwise direction, as viewed in Figure 1, causes the reel to take up the line in both directions around the lugs 56.

In Figure 2, the jack is disposed differently to tighten the line 160. In this figure it is assumed that the left end of the line is fastened and the right end of the line is free. With this arrangement the line may be looped as at 162 around the support 164 and the doubled line may be passed between the members 36 and disposed between the lugs 56. Rotation of the handle then in a counterclockwise direction, as viewed in this figure, causes both the doubled end and the single end of the line to be tightened around the lugs 56.

In Figure 3 still a different method of tightening is contemplated. It is assumed in this figure that the line 170 is fastened adjacent its left end. The tightener is secured to the fastening means 172 as through the hole 38 and the loose end of the line is passed between the members 58. The handle 54 is rotated in a counterclockwise direction causing the reel to tighten the free end of the line 170 about the lugs 56. The release of the line is caused by operation of the tighteners in the manner already described.

It is to be understood that this application is not to be limited by the exact embodiments of the device shown, which are merely by way of illustration and not limitation, as various and other forms of the device will, of course, be apparent to those skilled in the art without departing from the spirit of the invention or the scope of the claims.

I claim:

1. In a jack for tightening lines or the like, the combination of a housing having a reel rotatably mounted therein, spaced members provided by the reel for engaging a line, whereby rotation of the reel in a certain direction will cause the line to be wound on said spaced members, a gear wheel provided on said reel, a ratchet pawl pivoted to said housing and adapted to engage the gear wheel for locking the reel in selected positions, a pinion-gear movable into and out of engagement with said gear wheel, rotatable means rotatable in one direction for moving the pinion-gear into engagement with the gear wheel and for rotating said pinion-gear to thereby rotate said reel, a second pawl pivoted to the housing and adapted to engage the pinion-gear, said second pawl effecting bodily movement of the pinion-gear from contact with the gear wheel when said rotatable means is rotated in another direction, and said bodily movement of the pinion-gear simultaneously disconnecting the ratchet-pawl from the ratchet wheel to permit free rotation of the reel.

2. In a jack for tightening lines or the like, the combination of a housing having a reel rotatably mounted therein, spaced members provided by the reel for engaging a line, whereby rotation of the reel in a certain direction will cause the line to be wound on said spaced members, a gear wheel provided on said reel, a ratchet pawl pivoted to said housing and adapted to engage the gear wheel for locking the reel in selected positions, a pinion-gear movable into and out of engagement with said gear wheel, a rotatable handle member fixed to the pinion-gear and rotatable in one direction for bodily moving the pinion-gear into engagement with the gear wheel and for rotating said pinion-gear to thereby rotate said reel, a second pawl pivoted to the housing and adapted to engage the pinion-gear, said second pawl effecting bodily movement of the pinion-gear from contact with the gear wheel when said rotatable handle member is rotated in another direction, and said bodily movement of the pinion-gear simultaneously disconnecting the ratchet-pawl from the gear wheel to permit free rotation of the reel.

3. In a jack for tightening lines and the like, the combination of a housing, a reel having line engaging members and being rotatably mounted by the housing, a gear wheel fixed to the reel and having location within the housing, a pinion-gear within the housing in alignment with a slotted opening formed in a wall of the housing, said pinion-gear being movable into and out of engagement with said gear wheel, a rotatable member disposed in said slotted opening and to which the pinion-gear is fixed, a ratchet pawl pivoted to the housing and adapted to engage the gear wheel for locking the reel in selected positions, said ratchet pawl being located adjacent the pinion-gear and on the side thereof opposite the gear wheel, a second pawl also pivoted to the housing and adapted to engage the pinion-gear, whereby rotation of the rotatable member in a certain direction will cause bodily movement of the pinion-gear due to pivoting of the same on the second pawl to move the pinion-gear out of contact with the gear wheel, and whereby said bodily movement of the pinion-gear will effect similar movement of the ratchet pawl to disconnect the pawl from the gear wheel.

KENLY C. BUGG.

REFERENCES CITED

The following references are of record in the file of this patent:

UNITED STATES PATENTS

| Number | Name | Date |
|---|---|---|
| 36,330 | Babcock | Sept. 2, 1862 |
| 49,217 | Best | Aug. 8, 1865 |
| 156,826 | Sweet | Nov. 10, 1874 |

FOREIGN PATENTS

| Number | Country | Date |
|---|---|---|
| 36,907 | France | Sept. 6, 1930 |

(Addition to No. 608,455)